United States Patent
Sathish et al.

(10) Patent No.: US 9,256,541 B2
(45) Date of Patent: Feb. 9, 2016

(54) DYNAMICALLY ADJUSTING THE HARDWARE STREAM PREFETCHER PREFETCH AHEAD DISTANCE

(71) Applicant: Oracle International Corporation, Redwood City, CA (US)

(72) Inventors: Vijay Sathish, Santa Clara, CA (US); Yuan Chou, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 66 days.

(21) Appl. No.: 14/295,831

(22) Filed: Jun. 4, 2014

(65) Prior Publication Data

US 2015/0356014 A1    Dec. 10, 2015

(51) Int. Cl.
*G06F 12/08* (2006.01)

(52) U.S. Cl.
CPC .... *G06F 12/0862* (2013.01); *G06F 2212/1024* (2013.01); *G06F 2212/152* (2013.01); *G06F 2212/251* (2013.01); *G06F 2212/305* (2013.01); *G06F 2212/602* (2013.01); *G06F 2212/6022* (2013.01)

(58) Field of Classification Search
CPC .................. G06F 12/0862; G06F 2212/1024; G06F 2212/152; G06F 2212/251; G06F 2212/305; G06F 2212/602; G06F 2212/6022
See application file for complete search history.

(56) References Cited

U.S. PATENT DOCUMENTS

| | | | |
|---|---|---|---|
| 4,489,378 A | 12/1984 | Dixon | |
| 5,835,967 A | 11/1998 | McMahan | |
| 6,321,330 B1 | 11/2001 | Doshi | |
| 6,574,713 B1 * | 6/2003 | Kosche | G06F 8/442 711/117 |
| 7,487,297 B2 | 2/2009 | El-Essawy | |
| 7,702,857 B2 | 4/2010 | Gill | |
| 7,836,259 B1 * | 11/2010 | Filippo | G06F 12/0862 711/137 |
| 7,917,702 B2 | 3/2011 | Morrow | |
| 7,958,316 B2 | 6/2011 | Speight | |
| 2007/0226462 A1 * | 9/2007 | Scott | G06F 9/30149 712/207 |
| 2007/0288697 A1 * | 12/2007 | Keltcher | G06F 9/383 711/137 |
| 2009/0019229 A1 * | 1/2009 | Morrow | G06F 12/0862 711/137 |
| 2011/0246722 A1 * | 10/2011 | Taha | G06F 12/0862 711/137 |
| 2012/0005457 A1 | 1/2012 | Chen | |
| 2015/0106590 A1 * | 4/2015 | Chou | G06F 9/30072 712/207 |
| 2015/0134933 A1 * | 5/2015 | Holm | G06F 12/0862 712/207 |
| 2015/0234663 A1 * | 8/2015 | Chishti | G06F 9/3808 712/207 |

* cited by examiner

*Primary Examiner* — Hiep Nguyen
(74) *Attorney, Agent, or Firm* — Meyertons Hood Kivlin Kowert & Goetzel

(57) ABSTRACT

An apparatus for prefetching data for a processor is presented. The apparatus may include a memory, a first counter, a second counter, and a control circuit. The memory may include a table with at least one entry in which the at least one entry may include an expected address of a next memory access and a next address from which to fetch data, wherein the next address is an offset value different from the expected address. The at least one entry may also include a maximum limit for the offset value. The first counter may increment responsive to an address of a memory access matching the expected address. The second counter may increment responsive to the address of the memory access resulting in a cache miss. The control circuitry may be configured to increment the maximum value of the offset value dependent upon a value of the second counter.

20 Claims, 7 Drawing Sheets

DYNAMICALLY ADJUSTING THE HARDWARE STREAM PREFETCHER PREFETCH AHEAD DISTANCE

BACKGROUND

1. Field of the Invention

This disclosure relates to processors and, more particularly, to implementation of data prefetch systems.

2. Description of the Related Art

To improve execution performance, a processor may include one or more levels of cache memories (commonly referred to as "caches"). A cache may be used to store frequently accessed instructions and/or memory data, and improve performance by reducing the time for the processor to retrieve these instructions and data. A processor may include a fast low/first-level (L1) cache backed by a larger, slower second-level (L2) cache. Some processors may include a high/third-level (L3) cache for further performance improvement.

Some processors may include a prefetch buffer for a given cache to further improve memory access times. A prefetch buffer for the given cache may read data from a higher level cache or a system memory in anticipation of an upcoming request from the cache, i.e., prefetch data before the processor requests the data. A prefetch buffer may learn memory access patterns corresponding to one of more software processes running in the processor. Using these patterns, the prefetch buffer may then read data before the cache request it.

Prefetch buffers may have a fixed limit in terms of how many bytes of data may be prefetched (i.e., the look-ahead distance). For some software processes, the fixed limit may be too small, such that the data is read into the processor faster than the prefetch buffer can read it, which may result in the processor pausing execution to wait for the data. For other processes, if the fixed limit is too large, older data in the cache may be discarded to make room for the new data being fetched, which may result in data in active use by the processor being deleted too early or the prefetched data being stale (i.e., the original data is modified by another process or functional block in the system after being fetched).

Determining a look-ahead distance that adequately supports processes that consume data rapidly and processes that consume data slowly may be a difficult design trade-off. A system is desired in which a prefetch buffer system may support various software processes when the processes have various data usage rates.

SUMMARY

Various embodiments of for improving system performance through the use of prefetched cached information in a processor are disclosed. Broadly speaking, a system, an apparatus, and a method are contemplated in which the apparatus may include a memory, a first counter, a second counter, and a control circuit. The memory may be configured to store a first table, wherein the first table may include a first entry, wherein the first entry includes an expected address of a next memory request by a processor, a next address, wherein the next address is greater than or less than the expected address by an offset value, and a maximum limit of the offset value. The first counter may be configured to increment responsive to a determination that an address of a memory request by the processor matches the expected address. The second counter may be configured to increment responsive to a determination that the address of the memory request resulted in a cache miss. The control circuit may be configured to increment the maximum limit of the offset value dependent upon a value of the second counter.

In a further embodiment, the control circuit may be further configured to increment the maximum limit of the offset value responsive to a determination that the value of the second counter is greater than or equal to a threshold value. In another embodiment, the control circuit may be further configured to increment the maximum limit of the offset value responsive to a determination that the offset value is equal to the maximum limit of the offset value.

In one embodiment, the control circuit may be further configured to reset the first counter and the second counter responsive to a determination that the value of the first counter is equal to a threshold value. In another embodiment, the control circuit may be further configured to reset the first counter and the second counter responsive to incrementing the maximum limit of the offset value.

In a further embodiment, the threshold value may be programmable. In another embodiment, initial values for the first value and the second value are set dependent upon values in a second table included in the memory.

BRIEF DESCRIPTION OF THE DRAWINGS

The following detailed description makes reference to the accompanying drawings, which are now briefly described.

Figure 1:
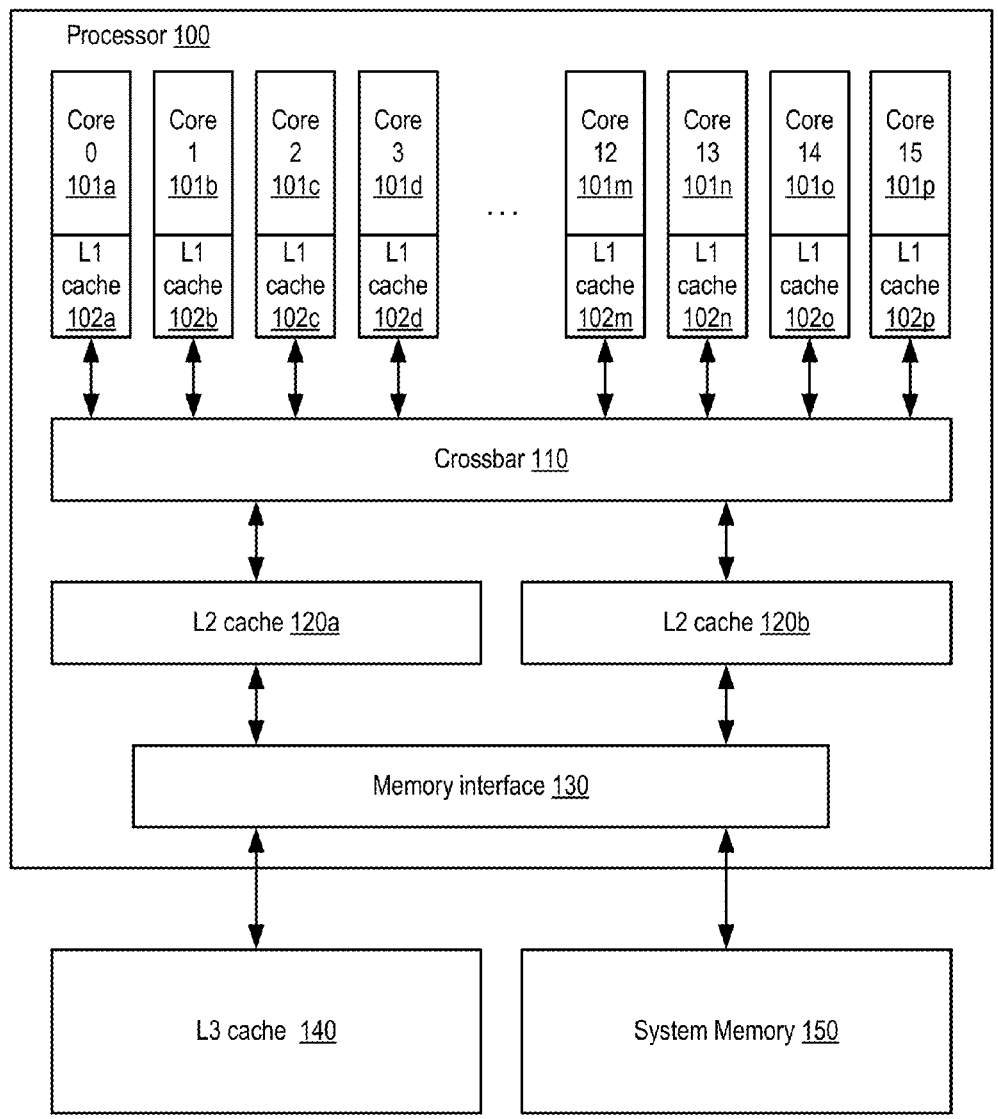
FIG. 1 illustrates a block diagram illustrating an embodiment of a multi-core processor.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

Introduction

Generally speaking, a processor core (or simply, a "core") may refer to a unit of a processor that is capable of executing program instructions and processing data independently of other processor cores within the processor, such that multiple cores may execute instructions concurrently. Performance of a processing core may be impacted by a multitude of factors, including processor clock speed, the number of cores in the processor, and speed of the memory accesses.

In some embodiments, a mechanism that may be utilized for improving the speed of the memory accesses and, therefore, the performance of a processing core is the use of a cache memory between the processor and the memory or memories from which data and program instructions are read. Caches may improve performance of a processor by storing data and/or instructions read from frequently accessed locations in an original memory and saving this data in a local memory that may have faster access times than the original memory.

A prefetch buffer may be utilized to further improve the performance and/or the efficiency of memory accesses. Working in combination with a cache memory, a prefetch buffer may improve a flow of data into a processor by anticipating which data will be required for a particular software process (also commonly referred to as a process thread) and reading this data before the processor request the data. If the prefetch buffer has accurately anticipated the processors data needs, then, in response to a data request from a processor, the requested data may be available to the processor with little to no delay.

Various embodiments of prefetch buffers and methods to manage the prefetching operations are discussed in this disclosure. The embodiments illustrated in the drawings and described below may provide techniques for managing the operations of a prefetch buffer in a computing system that may improve the efficiency and/or performance of memory operations in a processor.

Multicore Processor Overview

In various embodiments, a multicore processor may include a number of instances of a processing core, as well as other features. One example of an 16-core processor is depicted in FIG. 1. In the illustrated embodiment, processor 100 may include sixteen instances of a core, denoted as cores 101a-p and also designated "core 0" though "core 15," although for clarity, not all instances are shown in FIG. 1. Cores 101a-p may each include local L1 cache 102a-p. Cores 101a-p may be coupled to L2 caches 120a and 120b through crossbar 110. In addition, cores 101a-p may be coupled to memory interface 130 through L2 caches 120a-b. Memory interface 130 may be further coupled to L3 cache 140 as well as system memory 150. It is noted that in various embodiments, the organization of FIG. 1 may represent a logical organization rather than a physical organization, and other components may also be employed. For example, in some embodiments, cores 101a-p and L2 caches 120a-b may not connect directly to crossbar 410, but may instead interface with the crossbar through intermediate logic. L3 cache 140 and system memory may reside external to processor 100.

Cores 101a-p may be configured to execute instructions and to process data according to a particular Instruction Set Architecture (ISA). In one embodiment, cores 101a-p may be configured to implement the SPARC® V9 ISA, although in other embodiments it is contemplated that any desired ISA may be employed, such as x86, PowerPC® or MIPS®, for example. Additionally, as described in greater detail below, in some embodiments each instance of core 101 may be configured to execute multiple threads concurrently, where each thread may include a set of instructions that may execute independently of instructions from another thread. In various embodiments it is contemplated that any suitable number of cores 101a-p may be included within a processor, and that cores 101a-p may concurrently process some number of threads.

L1 caches 102a-p may reside within cores 101a-p or may reside between cores 101a-p and crossbar 110. L1 caches 102a-p may be configured to cache instructions and data for use by their respective cores 101a-p. In some embodiments, each individual cache 102a-p may be implemented using set-associative or direct-mapped techniques. For example, in one embodiment, L1 caches 102a-p may be 13 kilobyte (KB) caches, where each L1 cache 102a-p is 2-way set associative with a 13-byte line size, although other cache sizes and geometries are possible and contemplated.

It is noted that an entry in a cache may be referred to as a cache line. Each cache line in a cache may include the data being stored, flags corresponding to the coherency state, and an address tag. A cache tag may include all or a part of the original address of the data being stored in the cache line, an index indicating in which cache line the cached data is stored, and an offset indicating where in each cache line the specific data is located. A given processor core may access a cache with a direct address of the memory location, a translated address based on lookup tables, or through an address calculated based on an instruction's address mode.

Crossbar 110 may be configured to manage data flow between cores 101a-p and the shared L2 caches 120a-b. In one embodiment, crossbar 110 may include logic (such as multiplexers or a switch fabric, for example) that allows any core 101a-p to access any bank of L2 cache 120a-b, and that conversely allows data to be returned from any bank of L2 cache 120a-b to any core 101a-p. Crossbar 110 may be configured to concurrently process data requests from cores 101a-p to L2 cache 120a-b as well as data responses from L2 cache 120a-b to cores 101a-p. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 101a-p attempt to access a single bank of L2 cache 120a-b or vice versa. It is noted that in various embodiments, crossbars 110 may be implemented using any suitable type of interconnect network, which, in some embodiments, may correspond to a physical crossbar interconnect.

L2 caches 120a-b may be configured to cache instructions and data for use by cores 101a-p. L2 cache 120a may be coupled to cores 101a-h and L2 cache 120b may similarly be coupled to cores 101i-p. As the number of cores 101 is increased, the size and/or number of L2 caches 120 may also be increased in order to accommodate the additional cores 101. For example, in an embodiment including 16 cores, L2 cache 120 may be configured as 2 caches of 3 MB each, with each cache including 8 individual cache banks of 384 KB, where each bank may be 24-way set associative with 256 sets and a 13-byte line size, although any other suitable cache size or geometry may also be employed.

In some embodiments, L2 caches 120a-b may include various queues and buffers configured to manage the flow of data to and from crossbar 110 as well as to and from L3 cache 140. For example, such embodiments of L2 cache 120a-b may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). In some embodiments, multiple banks of L2 cache 120 may share single instances of certain data structures or other features. For example, a single instance of a fill buffer may be shared by multiple banks of an L2 cache 120 in order to simplify the physical implementation (e.g., routing and floor-planning) of L2 cache 120a-b. Despite this sharing, individual banks of L2 caches 120a-b may be configured to concurrently and independently process accesses to data stored within the banks when such concurrency is possible.

Like L1 caches 101a-p and L2 caches 120a-b, L3 cache 140 may be configured to cache instructions and data for use by cores 101a-p. In some embodiments, L3 cache may be implemented on a separate memory chip external to processor 100 and accessed through memory interface 130. In other embodiments, L3 cache may be implemented on the same die as processor 100, in which case, L3 cache 140 may be accessed directly. Similar to L1 caches 102a-p, L3 cache 140 may be implemented using set-associative or direct-mapped techniques. For example, in one embodiment, L3 cache 140 may be an 8 megabyte (MB) cache, where the 8 MB bank is 16-way set associative with a 13-byte line size, although other cache sizes and geometries are possible and contemplated.

The cache hierarchy may be established such that any core 101 may first access its respective L1 cache 102. If the access to L1 cache 102 is a miss, then the respective L2 cache 120 may be accessed. If the L2 cache 120 access is a miss, then L3 cache 140 may be accessed next. If all three cache levels miss, then system memory 150 may be accessed through memory interface 130.

Memory interface 130 may be configured to manage the transfer of data between L2 caches 120a-b and L3 cache 140 or system memory 150 in response to L2 fill requests and data evictions, for example. In some embodiments, multiple instances of memory interface 130 may be implemented, with each instance configured to control a respective bank of L3 cache 140 or system memory 150. Memory interface 130 may be configured to interface to any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of memory, such that L3 cache 140 and system memory 150 may be composed of two or more of the listed types.

It is noted that FIG. 1 is merely an example of a multicore processor. In other embodiments, processor 100 may include network and/or peripheral interfaces. The physical structure may not be represented by FIG. 1 as many other physical arrangements may be possible and are contemplated.

Processor Core with Prefetch Unit

Figure 2:
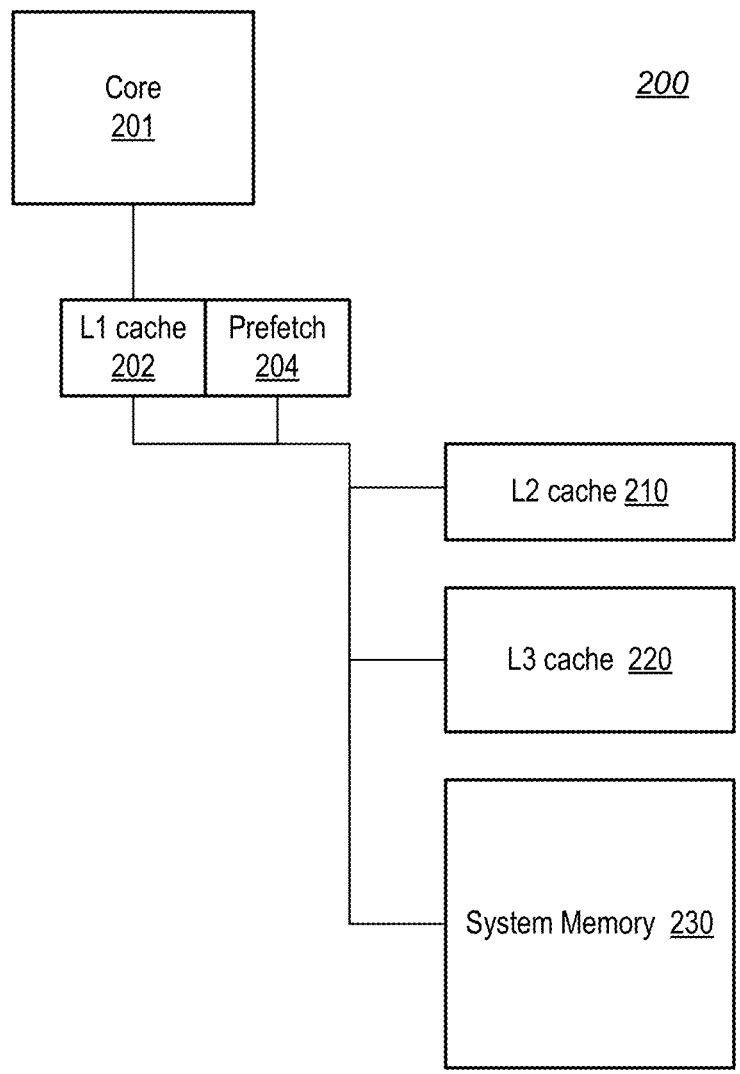
FIG. 2 is a block diagram illustrating an embodiment of a processor memory path.

Turning to FIG. 2, an embodiment of a processor core with a prefetch buffer is illustrated. System 200 may correspond to a portion of processor 100 as illustrated in FIG. 1. Core 201 may correspond to a given core 101 in FIG. 1, and may, therefore, function as described above in relation to cores 101a-p. Core 201 may be coupled to L1 cache 202 which may correspond to a respective L1 cache 102 in FIG. 1. L1 cache 202 may be coupled to prefetch unit 204, L2 cache 210, L3 cache 220 and system memory 230.

L1 cache 202 may provide the fastest memory access to core 201 and may, therefore, be the first memory accessed by core 201 when core 201 needs to access a memory location. L1 may function as per the description above in regards to L1 caches 102a-p. L1 cache 202 may include multiple cache lines and may assign a given line or set of lines to a respective processing thread executing in core 201. In addition, L1 cache 202 may operate in combination with prefetch unit 204 to provide data to core 201. When a cache miss occurs in L1 cache 202, then L1 cache 202 may look for the data in L2 cache 210, followed by L3 cache 220, and then in system memory 230.

Prefetch unit 204 may read data from L2 cache 210, L3 cache 220, and in system memory 230 in anticipation of core 201 requesting the data. The read data may be stored in one or more cache lines in L1 cache 202. In some embodiments, the read data may be buffered within prefetch unit 204 before being stored in L1 cache 202. In other embodiments, the read data may be stored directly to L1 cache 202. To know which data to read, prefetch unit 204 may detect patterns in memory accesses for corresponding values of a program counter (PC) of core 201. Control circuitry, which in some embodiments may include a prefetch learning table, may monitor addresses of memory accesses and the value of the PC when these accesses are made. By tracking the memory address accessed at a certain PC value, the control circuitry may establish a pattern such as, for example, when the PC equals 'X', a memory access is made to an address equal to the address of the previous memory access plus an offset of 'Y'. Once this pattern has been established, prefetch unit 204 may read a memory location corresponding to the previous address plus 'Y' whenever the PC approaches 'X'.

L2 cache 210, L3 cache 220 and system memory 230 may be similar to the descriptions of the corresponding memories in FIG. 1. These three memories may be composed of any suitable type of memory as disclosed herein and may be of the same type or may be any combination of types. In various embodiments, all three memories may be included on a single processor die along with core 201, cache 202 and prefetch unit 204, or system memory 230 may be on a different die or both system memory 230 and L3 cache 220 may be on different dies. In some embodiments, L2 cache 210, L3 cache 220 and system memory 230 may all be on different dies from core 201.

It is noted that the system of FIG. 2 is merely an example and functional blocks are limited to emphasize the functionality of a prefetch unit. In other embodiments, more functional blocks may be included. In other embodiments, L3 cache 220 may be omitted.

Figure 3:
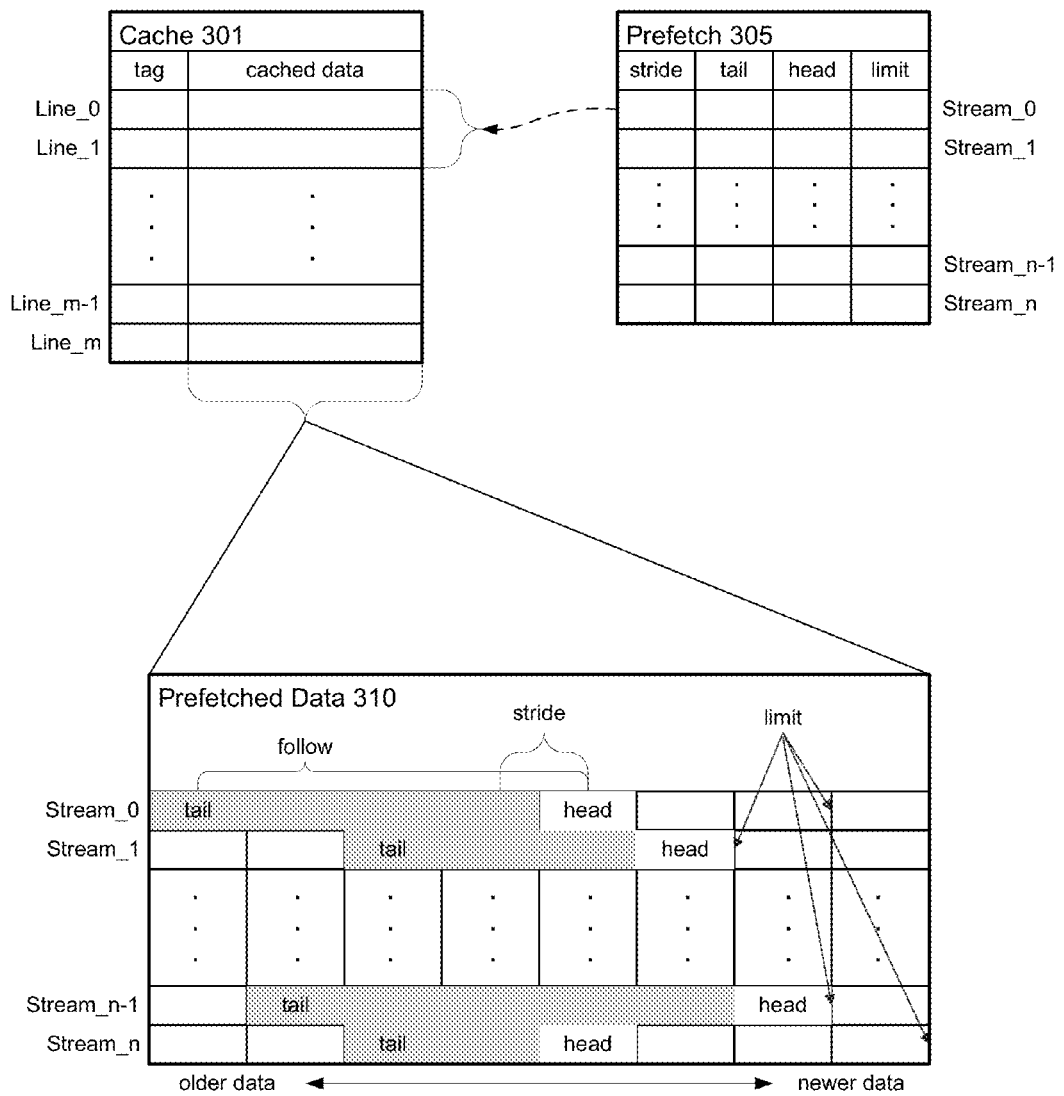
FIG. 3 illustrates an embodiment of data tables associated with a cache and a prefetch buffer.

Moving to FIG. 3, illustrations of a cache memory table and prefetch buffer tables are shown. Cache table 301 may illustrate a logical representation of how data is organized within a cache memory such as, for example, L1 cache 202 in FIG. 2. Prefetch buffer table 305 may show the organization of control values for a prefetch unit, such as, for example, prefetch unit 204 in FIG. 2. Prefetched data table 310 may illustrate more detail regarding the organization of the prefetched data in cache table 301.

Cache table 301 may be organized into multiple cache lines as indicated by line_0 through line_m, with each line including data and a tag. Each line may hold one or more bytes of data corresponding to range of memory addresses. The cached data may include data prefetched by prefetch unit 204. The cache line tag may include information regarding the data, including references to the original address of the data in a system memory. Additional information may include coherency information in relation to other memories in which the same data may be stored and/or the type of information stored, such as instructions or data.

Prefetch buffer 305 may also be organized into multiple entries, with each entry tracking data for a given data stream as indicated by stream_0 through stream_n. Each buffer stream may store fetched data for a corresponding software thread. A given stream may include associated values for managing the data in the stream. These stream management values may be set and updated individually such that streams are managed independently. A stride value may indicate an address increment for each data fetch. For example, if data from consecutive addresses is to be read, then the stride may equal '1' to increment the address by '1' for each prefetch of the stream. In another example, only every seventh address may be read, in which case the stride may be set to '7'. In some embodiments, a stride value may have a negative value such that successive data fetches may occur at lower address values from the previous data fetch. For example, a stride of '−4' may instruct prefetch unit 204 to fetch data at a starting address and decrementing to every fourth smaller address value.

A tail pointer may be included which may indicate the address corresponding to the oldest data (also referred to herein as the "tail data") in the stream and may be the next address expected to be accessed by the corresponding software thread. Another value for managing the data may be a head pointer. A head pointer may indicate the address for the next data prefetch in the stream. A follow pointer may represent an offset value between the head pointer and the tail pointer. In some embodiments, the offset value may be a number of bytes ahead the head pointer is from the tail pointer while in other embodiments, the follow pointer may be expressed in terms of a number of data accesses ahead the head pointer is from the tail pointer. The follow pointer may be a value stored in prefetch buffer 305 or the follow pointer may be determined from a combination of the head pointer, tail pointer and stride value. A head limit may be included, which may limit how far ahead the head pointer may be from the tail pointer, or, in other words, may indicate a maximum allowable value for the follow pointer. The head limit may be adjustable such that the amount of data stored in a given buffer stream may be adjusted to a suitable value for the corresponding software thread supported by the stream. More details on how the head limit is adjusted will be provided later in the disclosure.

An example of prefetch buffer data management may be shown in prefetched data table 310. Prefetched data table 310 may correspond to cached data in cache table 301. It is noted that the data management example is merely a logical example and is does not necessarily represent a physical orientation of fetched data. Each column in prefetched data table 310 may represent, in some embodiments, one data value per stream. A shaded box in a column may represent a data value currently stored in the corresponding stream. For this example, one data value may correspond to one byte of data, although a data value may be any suitable size of data, such as 16 bits, 32 bits, etc. In other embodiments, a shaded box may represent multiple data values, such as, for example, a cache line. For each illustrated stream, data may be stored starting in columns on the left and moving to columns on the right. The tail pointer, therefore, represents, or "points to," the oldest stored data in a given stream. It is noted that the order in which data is stored within a cache line as depicted in FIG. 3 is merely an example. In other embodiments, different alignments of bytes within a given stream may be employed Continuing with the example of prefetched data table 310, the head pointer for each stream may correspond to the first available buffer location to the right of the last fetched data byte. It is noted that the boxes indicating the head pointer are not shaded since the data the head pointer addresses has not yet been fetched. The stride value may be added to the address of the last fetched data to generate a next address for the head pointer. The follow pointer may indicate a number of data values are between the tail pointer and the head pointer. In some embodiments, the follow pointer may represent a number of bytes while, in other embodiments, the follow pointer may represent a number of accesses (if data is fetched in bytes, this would be the same). The head limit may indicate how many more prefetches may be executed for a given stream before the buffer stream is full.

In the illustration of prefetched data table 310, stream_1 and stream_n−1 have reached the head limit. In some embodiments, a stream reaching the head limit may cease prefetching and wait for a processor, such as core 201 in FIG. 2, to request the data at the tail pointer, at which point prefetch unit 204 may increment the tail pointer by the stride value and fetch the next data pointed to by the head pointer. In other embodiments, data corresponding to the tail pointer may be evicted without waiting for the data to be requested by core 201, and then the next data may be fetched. In the illustrated embodiment, stream_0 of prefetch buffer 305 is shown to manage the data in cache lines line_0 and line_1. In some embodiments, one buffer stream may fetch enough data to fill more than one cache line at a given time. In other embodiments, one buffer stream may fetch less data than one cache line.

It is noted that the tables of FIG. 3 are merely an example. In other embodiments, additional information may be included in cache table 301 or prefetch buffer 305. The tables of FIG. 3 are not intended to represent a physical arrangement of data stored in a cache or a prefetch buffer, but instead, are intended to merely illustrate a logical organization of data that may be included.

Figure 4:
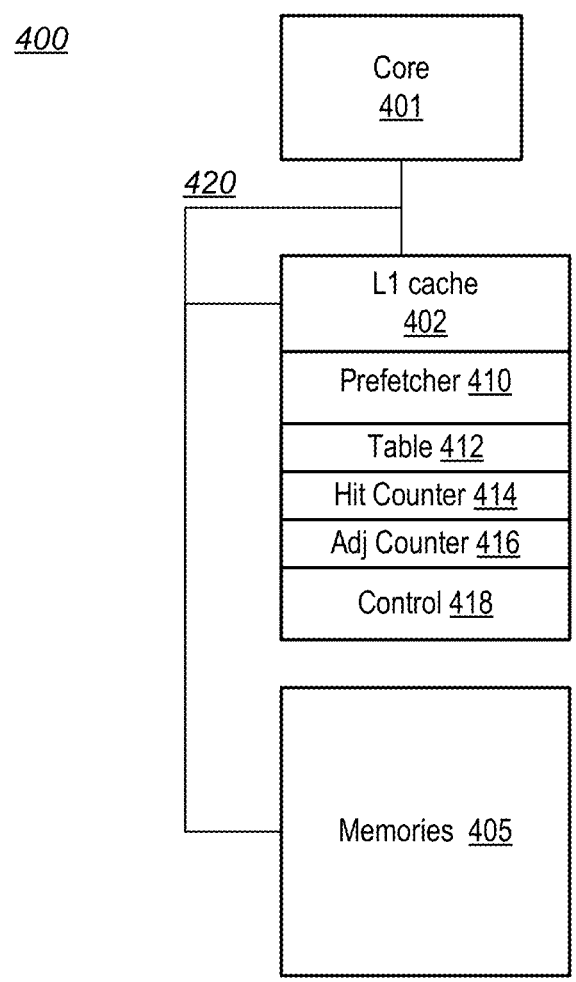
FIG. 4 is a block diagram illustrating an embodiment of a prefetch unit in a processor.

Turning now to FIG. 4, another embodiment of a processor core with a prefetch buffer is illustrated. System 400 may correspond to a portion of processor 100 as illustrated in FIG. 1. Core 401 may correspond to a given core 101 in FIG. 1, and may therefore function as described above in relation to cores 101*a-p*. Core 401 may be coupled to L1 cache 402 which may correspond to a respective L1 cache 102 in FIG. 1. L1 cache 402 may be coupled to prefetcher 410, and memories 405.

Similar to L1 cache 102, L1 cache 402 may provide a fast memory access for core 401. L1 cache 402 may access memories 405 via bus 420 in the event of a cache miss in L1 cache 402. L1 cache 402 may function in conjunction with prefetcher 410 to prefetch data into L1 cache 402 before the data is requested by core 401.

Prefetcher 410 may correspond to prefetch unit 204 in FIG. 2 and therefore may perform similar functions as described in regards to prefetch unit 204. Prefetcher 410 may include buffer table 412, hit counters 414, adjustment counters 416, and control logic 418. Buffer table 412 may correspond to prefetch buffer 305 in FIG. 3 and may therefore include control values for multiple buffer streams. Hit counters 414 and adjustment counters 416 may each include a counter circuit for each stream to count events relative to each stream as explained below. The counter circuits of hit counters 414 and adjustment counters 416 may be implemented in any suitable circuit design, such as state machines or cascaded flip-flops.

Prefetcher 410 may detect patterns in memory accesses by core 401, as described above in regards to prefetch unit 204 in FIG. 2, and may read memories 405, predicting the upcoming memory locations that will be accessed by core 401. Control unit 418 may include circuitry for detecting the memory access patterns as well as circuitry for predicting upcoming memory accesses. Upon reading memories 405, prefetcher 410 may store the read data in buffer table 412. When core 401 request data from a memory location successfully predicted by control unit 418 (referred to herein as a prefetch buffer hit), the data may be in L1 cache 402 and core 401 receives the data from L1 cache 402. Upon such a prefetch buffer hit, control unit 418 may increment a corresponding counter in hit counters 414 to track a number of prefetch buffer hits for the associated stream. In some situations, core 401 may request a range of data or may request data in succession faster than prefetcher 410 can fetch and store the data into L1 cache 402. When requested data corresponds to an active buffer stream but is not in L1 cache 402 (i.e., a prefetch buffer hit and an L1 cache miss), then control unit 418 may increment corresponding counters in both hit counters 414 and adjustment counters 416.

When L1 cache 402 is not full, such as, for example, after the system has powered up, instances in which a memory request from core 401 result in a prefetch buffer hit and a corresponding L1 cache miss may occur often. In these cases, both the corresponding hit counter 414 and adjustment counter 416 may be incremented by control unit 418. As more data is stored in L1 cache 402, L1 cache misses may become less frequent and the corresponding hit counter 414 may be incremented more frequently than the respective adjustment counter 416. Both hit counters 414 and adjustment counters 416 may have threshold values that, when reached, trigger an action by prefetcher 410. When a given adjustment counter 418 reaches its threshold value, control unit 418 may increase the value of the head limit for the respective buffer stream if the head pointer has reached the head limit. When a given one of hit counters 414 reaches its threshold, the given hit counter 414 and the respective adjustment counter 416 may be reset. In some embodiments, the threshold value may be a terminal count value, i.e., a maximum value the counter may be capable of reaching.

When a given one of adjustment counters 416 is incremented, this may be an indication that the corresponding buffer stream may not be prefetching enough data to keep L1 cache 402 ahead of the memory demand of an associated software thread running on core 401. If the given adjustment counter 416 is incremented enough times to reach the threshold value, then incrementing the corresponding head limit of the buffer stream may reduce such occurrences by allowing the corresponding buffer stream to prefetch more data for L1 cache 402. Similar to hit counters 414, the threshold value may, in some embodiments, be a terminal count value.

Conversely, by resetting the given adjustment counter when the associated hit counter 414 reaches its threshold value, the count of L1 cache misses is maintained within a determined range of prefetch buffer hits. For example, if the adjustment counter threshold is set to 20 and the hit counter threshold is set to 100, then the value of the head limit is incremented only after 20 L1 cache misses have occurred within 100 prefetch buffer hits. If 100 prefetch buffer hits occur before 20 L1 cache misses occur, then the current settings for the corresponding buffer stream may be considered adequate. In some embodiments, the threshold values may be set to respective values that are consistent for all buffer streams, such that all hit counters 414 have one threshold value and all adjustment counters 416 share another value. In other embodiments, the threshold values may be set to individual values for each buffer stream depending upon a software process associated with each stream. Both hit counters 414 and adjustment counters 416 may resume incrementing as described after being reset.

It is noted that the cache of FIG. 4 is merely an example and functional blocks are limited to emphasize the functionality of a prefetch buffer. In other embodiments, more functional blocks may be included. In other embodiments, memories 405 may include several different memory modules, including additional caches.

Methods for Operating a Prefetch Buffer

Figure 5:
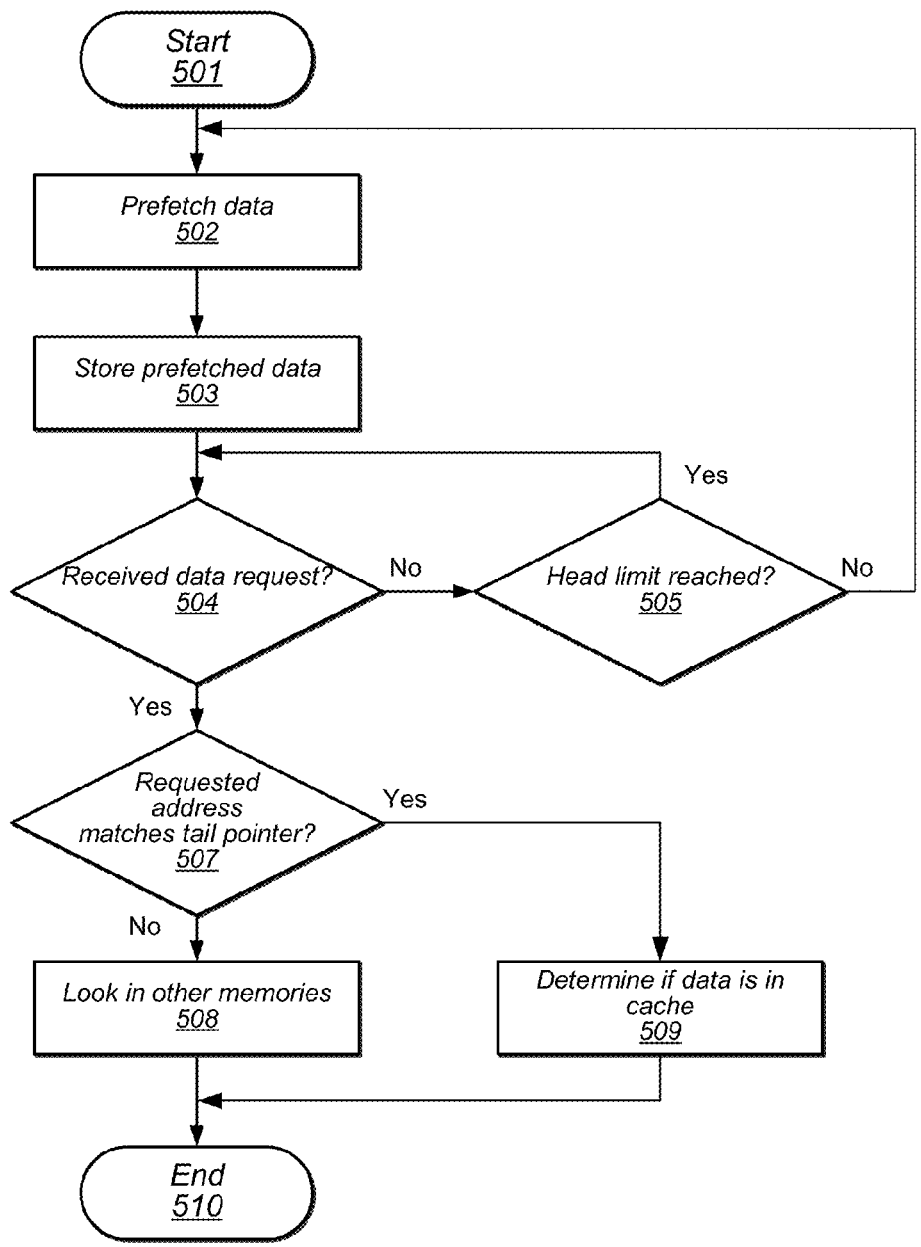
FIG. 5 is a flow diagram illustrating a method for prefetching data.

Turning to FIG. 5, a method is illustrated for operating a prefetch buffer, such as, e.g., prefetcher 410 in FIG. 4. Referring collectively to FIG. 4 and the flowchart in FIG. 5, the method may begin in block 501.

Prefetcher 410 may read data from a memory such as memories 405 (block 502). If prefetcher 410 has previously fetched data, then the address for reading may be generated dependent upon a head pointer and stride value of prefetcher 410. Otherwise, if prefetcher 410 is prefetching its first value, then the address may have been determined by a prefetch learning table associated with prefetcher 410.

The read data may be stored in a cache memory such as, for example, L1 cache 402 (block 503). In some embodiments, the read data may be stored in a buffer memory included in prefetcher 410 before storing in L1 cache 402. Upon storing the read data, new values for the head pointer and a follow pointer may be determined.

The method may be dependent upon a determination if L1 cache 402 has received a request for data (block 504). If a request has been received, from, e.g., core 401, then the method may move to block 507 to determine if the requested address matches a tail pointer of prefetcher 410. Otherwise, the method may move to block 505 to determine if a head limit has been reached.

If a data request has not been received, then the method may depend on the head limit of prefetcher 410 (block 505). If the head limit has not been reached, then the method may return to block 502 to prefetch the next data. Prefetcher 410 may continue to prefetch data, independently of data requests from core 401, until the follow pointer reaches the head limit. If the follow pointer has reached the head limit, then buffer table 412 may have reached the limit of data it may prefetch and may return to block 504 to wait for a data request before fetching further data. In some embodiments, prefetcher 410 may not wait for a data request and may instead evict or tag data at the tail pointer as invalid and return to block 502 instead to fetch the next data value.

If, in block 504, a data request has been received, then the method may depend upon an address of the received data request (block 507). If the address of the received data request does not match the tail pointer in buffer table 412, then other memories may be accessed for the requested data in block 508. Otherwise, the method may move to block 509 to determine if L1 cache 402 stores the data.

Other memories may be accessed if the requested address does not match the tail pointer (block 508). Other memories may include an L2 cache, an L3 cache, system RAM, or other memory included in the system. Once the data is identified and read, it may be stored in one or more cache memories. The method may then end in block 510.

If the requested address does match the tail pointer, then a determination may be made if the data is stored in L1 cache 402 (block 509). In addition to the determination, several other steps may be performed to determine if the head limit should be increased. These steps are presented in more detail below. The method may then end in block 510.

It is noted that the method illustrated in FIG. 5 is merely an example embodiment. Although the operations illustrated in the method in FIG. 5 are depicted as being performed in a sequential fashion, in other embodiments, some of the operations may be performed in parallel or in a different sequence. In some embodiments, additional operations may be included.

Figure 6:
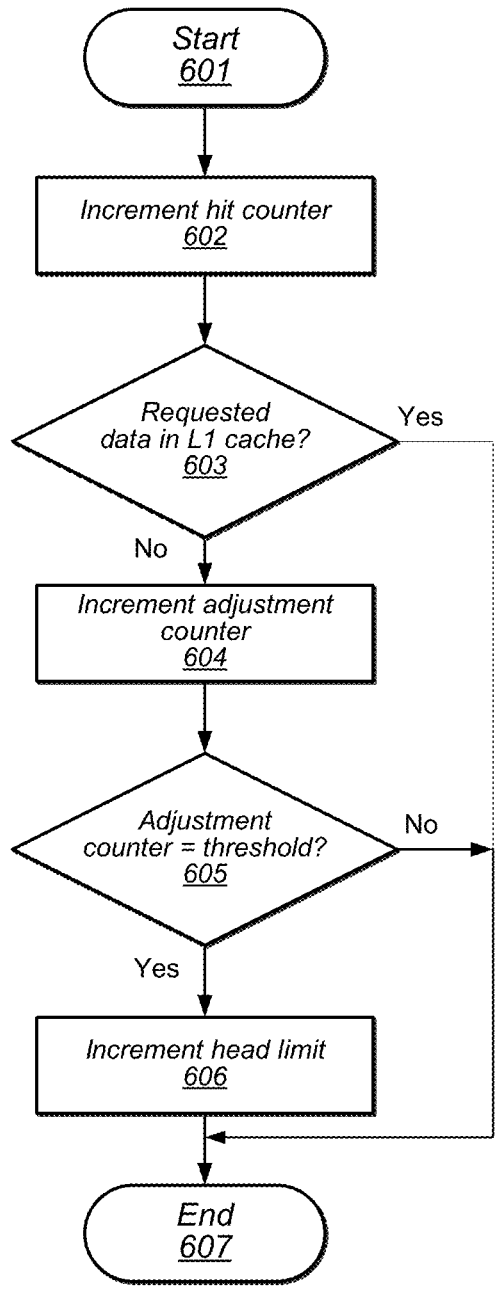
FIG. 6 illustrates a flow diagram of a method for adjusting a prefetch look-ahead distance.

Moving to FIG. 6, a method is illustrated for adjusting a head limit of a prefetch unit, such as, e.g., prefetcher 410 in FIG. 4. This method may correspond to block 509 of the method in FIG. 5. Referring collectively to FIG. 4 and the flowchart in FIG. 6, the method may begin in block 601 upon a determination that a requested address matches a tail pointer in a given buffer stream of buffer table 412.

A counter, such as, for example, a corresponding hit counter 414, may be incremented (block 602). System 400 may track a number of times a requested address matches a tail pointer address by incrementing a count for each occurrence. In some embodiments, the counters may be implemented as cascaded flip-flops and in other embodiments as a state machine.

A determination may be made if the requested data is in L1 cache 402 (block 603). Under some circumstances, data at the tail pointer may not have been received into L1 cache 402 yet (i.e., the data prefetch request from prefetch unit 410 is outstanding, but data may not have returned from memories 405). Under other conditions, data at the tail pointer may have been evicted or invalidated before being requested by core 401. Either occurrence may be symptomatic of not prefetching enough data. If the requested data is in L1 cache 402, then the method may move to block 607 and end. Otherwise, the method may move to block 604.

If the requested data is not in L1 cache 402, then another counter, such as, e.g., a corresponding adjustment counter 416, may be incremented (block 604). In addition to tracking the number of times a requested address matches a tail pointer address, System 400 may track a number of times the requested data is not in L1 cache 402. Similar to hit counters 414, adjustment counters 416 may be implemented with any suitable counter circuit.

A determination may be made if the corresponding adjustment counter 416 has reached a threshold value (block 605). If the corresponding adjustment counter 416 has reached a threshold value, then a head limit in the given buffer stream of buffer table 412 may be incremented in block 606. In some embodiments, a determination may first be made if a corresponding head pointer in buffer table 412 is equal to the head limit before incrementing the head limit of the given buffer stream. In various embodiments, the threshold value may be programmable, either during normal operation or during a manufacturing test process. If the adjustment counter is less than the threshold value, then the method may move to block 607 and end.

A head limit in the given buffer stream of buffer table 412 may be incremented (block 606). If the adjustment counter reached the threshold value and optionally if the corresponding head pointer equals the current head limit, then the prefetch unit may not be fetching enough values to stay ahead of a software process running on core 401. In response, the head limit may be increased to allow the corresponding buffer stream to fetch more values. An additional determination may be made if the head limit is equal to a maximum allowable head limit value. Head limits may be restricted to a maximum allowable value to limit how much memory in L1 cache 402 a buffer stream may be able to use at any given time. After incrementing the head limit, the method may end in block 607.

It is noted that the method of FIG. 6 is merely an example. The operations illustrated in the method in FIG. 6 are depicted as being performed serially. In other embodiments, however, some of the operations may be performed in parallel or in a different sequence. In some embodiments, additional operations may be included.

Figure 7:
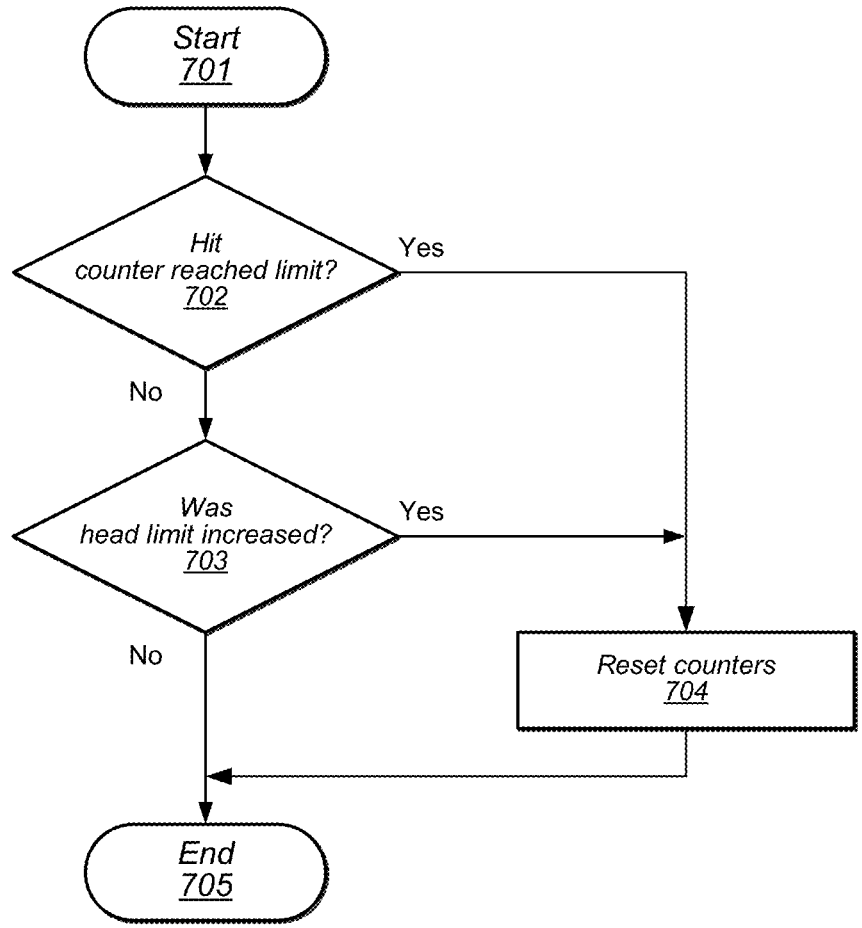
FIG. 7 is a flow diagram illustrating a method for resetting counters in a prefetch buffer.

Turning now to FIG. 7, a method is illustrated for resetting counters of a prefetch unit, such as, e.g., prefetcher 410 in FIG. 4. Referring collectively to FIG. 4 and the flowchart in FIG. 7, the method may begin in block 701 after a hit counter 414 for a given buffer stream in buffer table 412 has been incremented.

A determination may be made if the hit counter 414 has reached a predetermined limit (block 702). The predetermined limit may be a terminal value of the hit counter 414 or may be a preset or programmable value in various embodiments. If the predetermined value is programmable, then the value may be set dynamically during operation of system 400 or during a manufacturing test of system 400. If the predetermined limit has not been reached, then the method may move to block 703.

If the predetermined limit has been reached by the hit counter 414, then both the hit counter 414 and the corresponding adjustment counter 416 may be reset to their starting values or starting states (block 704). In some embodiments, the starting values may correspond to a zero value while, in other embodiments, the counters may be reset to another starting value. In further embodiments, the hit counter 414 may be reset to one value and the adjustment counter 416 may be reset to a different value. After resetting the counters, the method may end in block 705.

If the hit counter 414 for the given buffer stream did not reach the predetermined limit, then a determination may be made if the corresponding head limit was increased (block 703). Upon increasing the head limit, the corresponding hit counter 414 and adjustment counter 416 may be reset in block 704. If the head limit was not increased, then the method may end in block 705.

Resetting the hit counter 412 and adjustment counter 416 may create a measurement window for determining if the corresponding head limit should be incremented or not. If the hit counter 414 reaches the predetermined value before the adjustment counter 416 reaches the threshold value, may indicate that enough successful prefetch buffer hits are occurring relative to the number of corresponding L1 cache misses and therefore, the current head limit is satisfactory. On the other hand, if the adjustment counter 416 reaches the threshold value first, then the opposite may be true. The number of L1 cache misses relative to the number of corresponding prefetch buffer hits may indicate the head limit is too small and a corresponding software process running on core 401 may is accessing more data than is being buffered.

It is noted that the method illustrated in FIG. 7 is an example embodiment. Although the operations in the method in FIG. 7 are depicted as being performed in series, in other embodiments, some of the operations may be performed in parallel or in a different sequence. In some embodiments, additional operations may be included.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a memory configured to store a first table, wherein the first table includes a first entry, wherein the first entry includes:
      an expected address of a next memory request by a processor;
      a next address, wherein the next address is greater than or less than the expected address by an offset value; and
      a maximum limit of the offset value;
   a first counter configured to increment responsive to a determination that an address of a memory request by the processor matches the expected address;
   a second counter configured to increment responsive to a determination that the address of the memory request resulted in a cache miss; and
   a control circuit configured to increment the maximum limit of the offset value dependent upon a value of the second counter.

2. The apparatus of claim 1, wherein the control circuit is further configured to increment the maximum limit of the offset value responsive to a determination that the value of the second counter is greater than or equal to a threshold value.

3. The apparatus of claim 2, wherein the control circuit is further configured to increment the maximum limit of the offset value responsive to a determination that the offset value is equal to the maximum limit of the offset value.

4. The apparatus of claim 1, wherein the control circuit is further configured to reset the first counter and the second counter responsive to a determination that the value of the first counter is equal to a threshold value.

5. The apparatus of claim 1, wherein the control circuit is further configured to reset the first counter and the second counter responsive to incrementing the maximum limit of the offset value.

6. The apparatus of claim 2, wherein the threshold value is programmable.

7. The apparatus of claim 1, wherein initial values for the first value and the second value are set dependent upon values in a second table included in the memory.

8. A method, comprising:
   reading data from a memory at an expected address, wherein the data is read before a processor coupled to a cache memory requests data from the expected address;
   storing the read data in the cache memory;
   reading next data at a next address, wherein the next address is greater than or less than the expected address by an offset value, wherein the offset value is less than a maximum limit;
   incrementing a first counter responsive to the processor requesting data from the memory at the expected address;
   incrementing a second counter responsive to the expected address of the processor's request resulting in a cache miss; and
   incrementing the maximum limit of the offset value dependent upon a value of the second counter.

9. The method of claim 8, further comprising incrementing the maximum limit of the offset value responsive to the value of the second counter being greater than or equal to a threshold value.

10. The method of claim 9, wherein the threshold value is programmable.

11. The method of claim 9, wherein incrementing the maximum limit of the offset value dependent upon the value of the second counter further comprises incrementing the maximum limit of the offset value responsive to a determination that the offset value is equal to the maximum limit of the offset value.

12. The method of claim 8, further comprising resetting the first counter and the second counter responsive to a determination that a value of the first counter is equal to a threshold value.

13. The method of claim 12, wherein the threshold value is programmable.

14. The method of claim 8, further comprising resetting the first counter and the second counter responsive to incrementing the maximum limit of the offset value.

15. A system, comprising:
   a processor configured to execute a plurality of threads;
   a cache memory coupled to the processor, wherein the cache memory is configured to store data for the processor;
   one or more additional memories; and
   a prefetch unit coupled to the cache memory and the one or more additional memories, wherein the prefetch unit is configured to include a table including a plurality of entries;
   wherein a given entry of the plurality of entries includes:
      an expected address of a next memory request by a respective thread of the plurality of threads;
      a next address wherein the next address is an offset value greater than or less than the expected address; and
      a maximum limit for the offset value;
   wherein the prefetch unit is configured to:
      increment a respective first count value of a plurality of first count values responsive to a determination that an address included in a memory request generated by the respective thread matches the expected address of the given entry;
      increment a respective second count value of a plurality of second count values responsive to a determination that the address included in the memory request generated by the respective thread resulted in a cache miss; and
      increment the maximum limit of the given entry dependent upon the respective second count value.

16. The system of claim 15, wherein the prefetch unit is further configured to increment the maximum limit of the given entry of the plurality of entries responsive to a determination the respective second count value is greater than or equal to a respective threshold value.

17. The system of claim 16, wherein the prefetch unit is further configured to increment the maximum limit of the given entry of the plurality of entries responsive to a determination that the offset value is greater than or equal to the maximum limit of the given entry.

18. The system of claim 15, wherein the prefetch unit is further configured to reset the respective first count value and the respective second count value responsive to a determination that the respective first count value is greater than or equal to a terminal count value.

19. The system of claim 16, wherein the prefetch unit is further configured to reset the respective first count value and the respective second count value responsive to incrementing the maximum limit of the given entry.

20. The system of claim 16, wherein the respective threshold value for the respective second count value is different than another threshold value of another second count value.

* * * * *